May 23, 1961  H. G. HENRICKSON  2,985,128
DIE SHAPING AND TRIMMING APPARATUS
Filed April 29, 1957  4 Sheets-Sheet 1
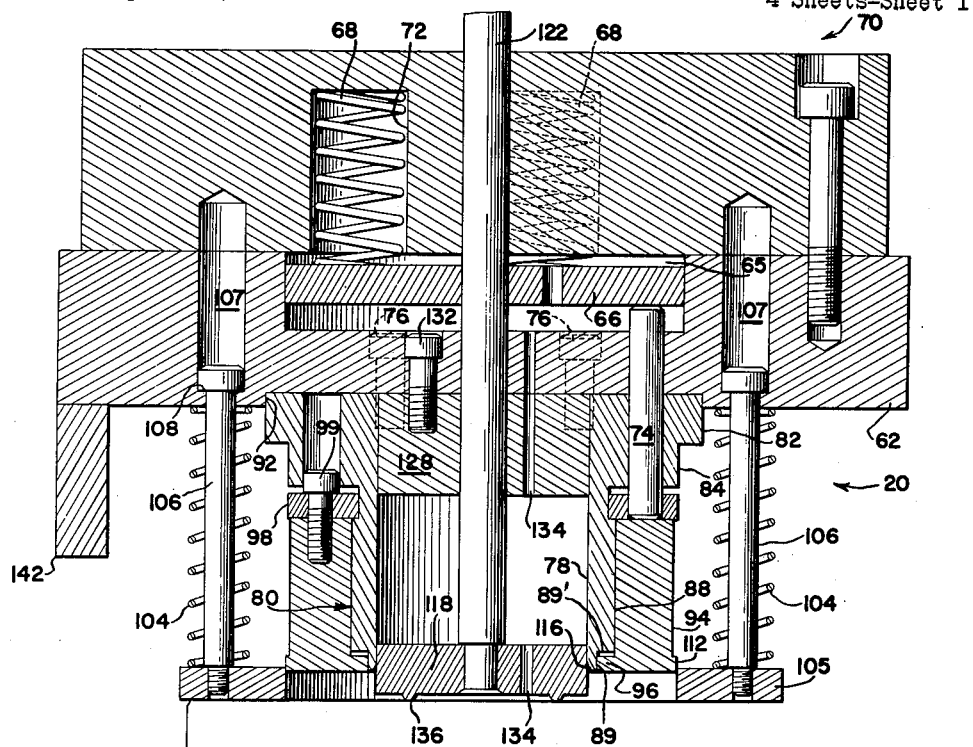
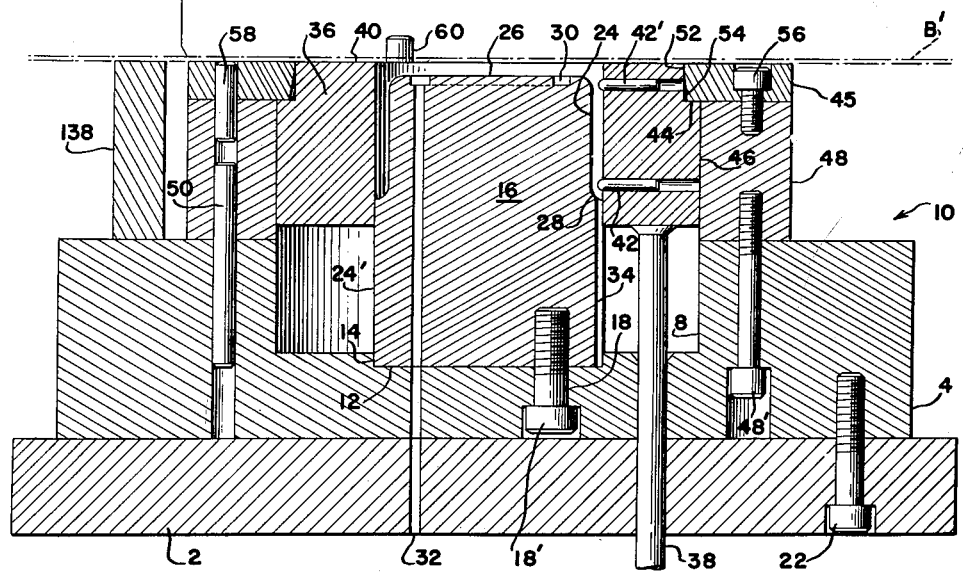
Fig. 1.

INVENTOR
HENRY G. HENRICKSON

BY James E. Toomey
ATTORNEY

May 23, 1961

H. G. HENRICKSON 2,985,128

DIE SHAPING AND TRIMMING APPARATUS

Filed April 29, 1957

INVENTOR

HENRY G. HENRICKSON

BY James E. Toomey

ATTORNEY

United States Patent Office 2,985,128
Patented May 23, 1961

2,985,128

DIE SHAPING AND TRIMMING APPARATUS

Henry George Henrickson, Des Plaines, Ill., assignor to Kaiser Aluminum & Chemical Corporation, Oakland, Calif., a corporation of Delaware Filed Apr. 29, 1957, Ser. No. 655,553

9 Claims. (Cl. 113—42)

This invention relates to the fabrication of cup-shaped articles from a flat blank. More particularly, the invention is concerned with providing a unique punch and die apparatus for forming such articles during a single stroke or operating cycle of the apparatus.

In the formation of cup-shaped articles having an upstanding wall, the free end of which terminates in a peripheral curl or lip, it has been conventional practice in the past to form such articles in a multi-stage or station operation. Ordinarily, a flat blank is placed between suitable cutter members to form a circular disc. The disc is then placed between punch and die members which draw the blank into a cup shape. Subsequently, the drawn blank is removed from the punch and die apparatus and transferred to a second device where, by the use of suitable die elements, the partially fabricated article is completed by placing a flanged or flared peripheral lip along the rim of the cup. The peripheral lip may be trimmed to its final dimension in the same or a subsequent operation.

The present invention contemplates the formation of cup-shaped articles having a peripheral lip or flange by use of a single apparatus wherein, in one operating cycle, the blank is cut from a web of material, drawn, and provided with a peripheral lip trimmed to the final form and dimensions desired. The invention further contemplates that such articles may be formed from a continuously moving web of metal which is fed beneath the operating parts of a die apparatus in timed relation to the cyclic operation of the die apparatus. The feed mechanism for such a web, however, forms no part of the present invention which is concerned primarily with the cutting, drawing, flanging and trimming of the blank, and hence will not be described.

Accordingly, a primary object of the instant invention is to produce a fully completed cup-shaped article in a single operating cycle of a forming apparatus.

Another object of the instant invention is to provide an apparatus capable of manufacturing successive fully completed cup-shaped articles from a continuous web of metal, such as aluminum.

A further object of the invention is to provide a unique die apparatus having a female die element which will accurately form and trim the peripheral edge of a cup-shaped article during the same operating cycle in which the main body portion of the article is drawn by the same female die element.

An additional object of the invention is to provide an apparatus which will cut a blank from a continuous web, form a cup-shaped article therefrom, and trim the peripheral edge of the article all during one operating stroke of the apparatus.

Another object of the instant invention is to provide a die apparatus wherein the male and female portions thereof are provided with unique means for drawing a container body and thereafter forming a peripheral lip thereon and trimming the lip to the desired dimensions during one operating stroke of the die apparatus.

These and other objects of the invention not specifically alluded to but inherent therein are accomplished by providing in a die apparatus a stationary male die member. The male die member is surrounded by a suitably biased draw ring which cooperates with a vertically reciprocating female die assembly. The female die assembly in turn includes a unique suitably biased forming and cutting member which is so shaped and so biased relative to the overall female die assembly, that during and after formation of the main body portion of a cup-shaped article, it will also curl the peripheral edge of the cup-shaped article and finally trim the curled edge to the proper dimension. The apparatus includes means actuated during the same operating cycle for cutting the web of material into individual blanks from which the finished articles are formed as well as means for ejecting the finished article. Suitable means may also be provided for removing any resultant scrap from between the die members such that the formation of the cup-shaped articles may be continuously carried out on a single machine and without human intervention during a series of operating cycles of the forming apparatus.

The manner of accomplishing the objects of the invention will become apparent when consideration is given to the appended drawings and the following detailed description wherein:

Fig. 1 is a sectional view of the novel die apparatus of the instant invention and shows the various components of the die apparatus in an "at rest" position, the space S illustrated by a bracket being sufficient to allow removal of a finished article;

Figure 2:
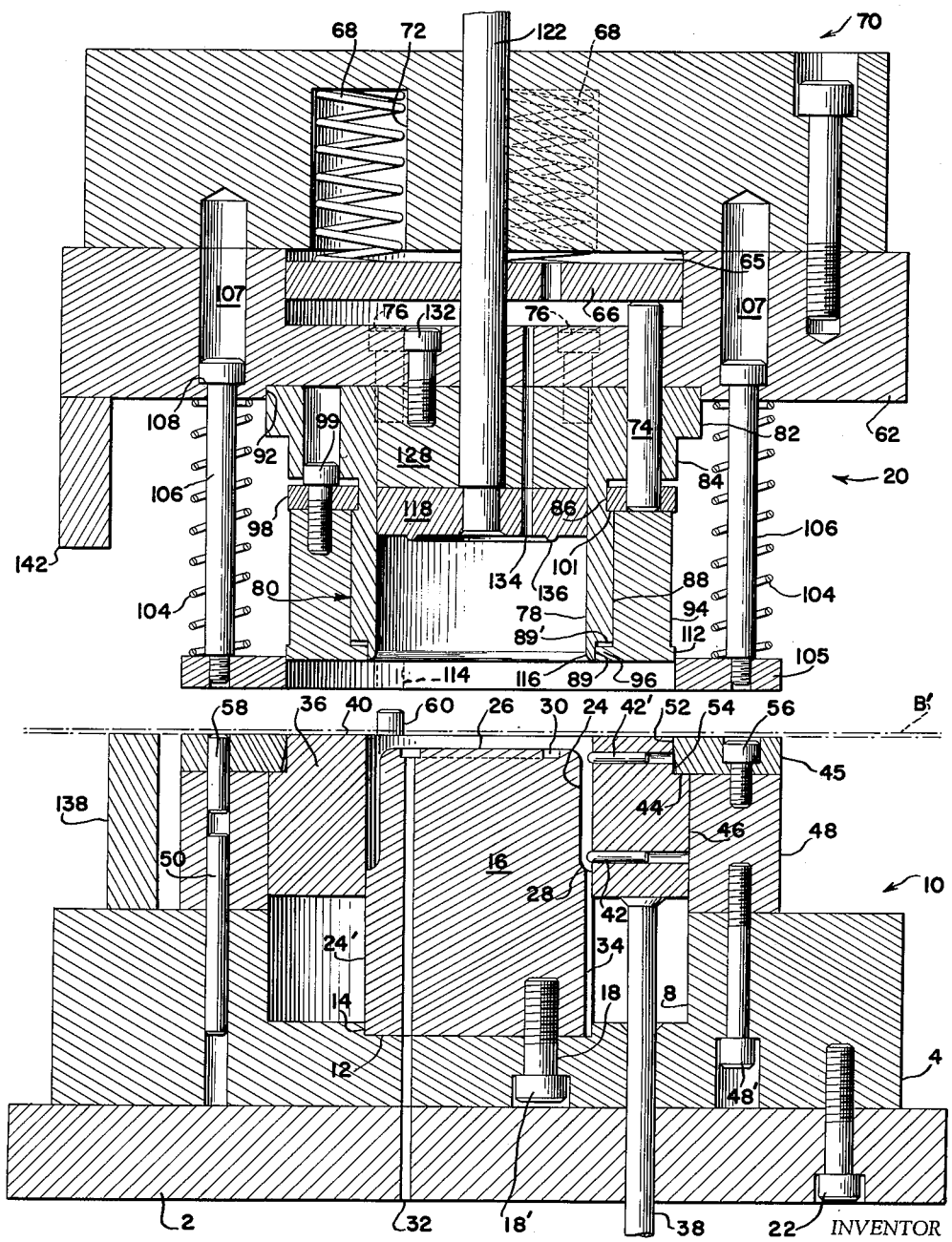
Fig. 2 is a sectional view similar to Fig. 1 and shows the position of the die parts in an intermediate stage of operation.

Considering now the apparatus shown in the several figures of the drawings, it may be seen that the apparatus generally comprises a lower die assembly 10 which will be referred to as a stationary assembly. There is also provided an upper movable die assembly 20, so-called because the entire assembly is so mounted as to be vertically reciprocated toward and away from the lower die assembly 10.

The lower die assembly 10 is mounted on a base member 2 such as a worktable for the machine. This die apparatus further includes a die block 4 having a centrally disposed annular recess defined by a cylindrical wall 8 and a stepped bottom 12. The stepped bottom 12 includes a central recess defined by a cylindrical wall 14, the latter being concentric with respect to cylindrical wall 8. The central recess provided in stepped bottom 12 is adapted to receive the base portion or end of a mandrel 16. The mandrel 16 is fixed within the recess in stepped bottom 12 by machine bolts 18 which have their heads 18' countersunk within the die block 4 such that this die block may rest on the upper and flat surface of the worktable or base 2 to which it is in turn fixed by machine screws or bolts 22.

The mandrel 16 includes a container or article forming top portion which is comprised of a cylindrical wall 24 and a generally flat top surface 26. The wall 24 is reduced or of less diameter than the diameter of the base 24' of the mandrel and is connected therewith by an annular arcuate step or land 28. The top surface 26 of the mandrel 16 is advantageously provided with an annular recess 30 concentrically located with respect to the wall 24. Recess 30 is also in communication with vent ports 32 which extend completely through the mandrel 16, the die block 4 and the base 2, whereby recess 30 may be vented to the atmosphere for a purpose to be hereinafter described during operation of the device.

The base portion of mandrel 16 is also provided with a series of vertically disposed slots or grooves 34, three in number as clearly disclosed in Figs. 1–4, for a purpose to be hereinafter described.

Figure 3:
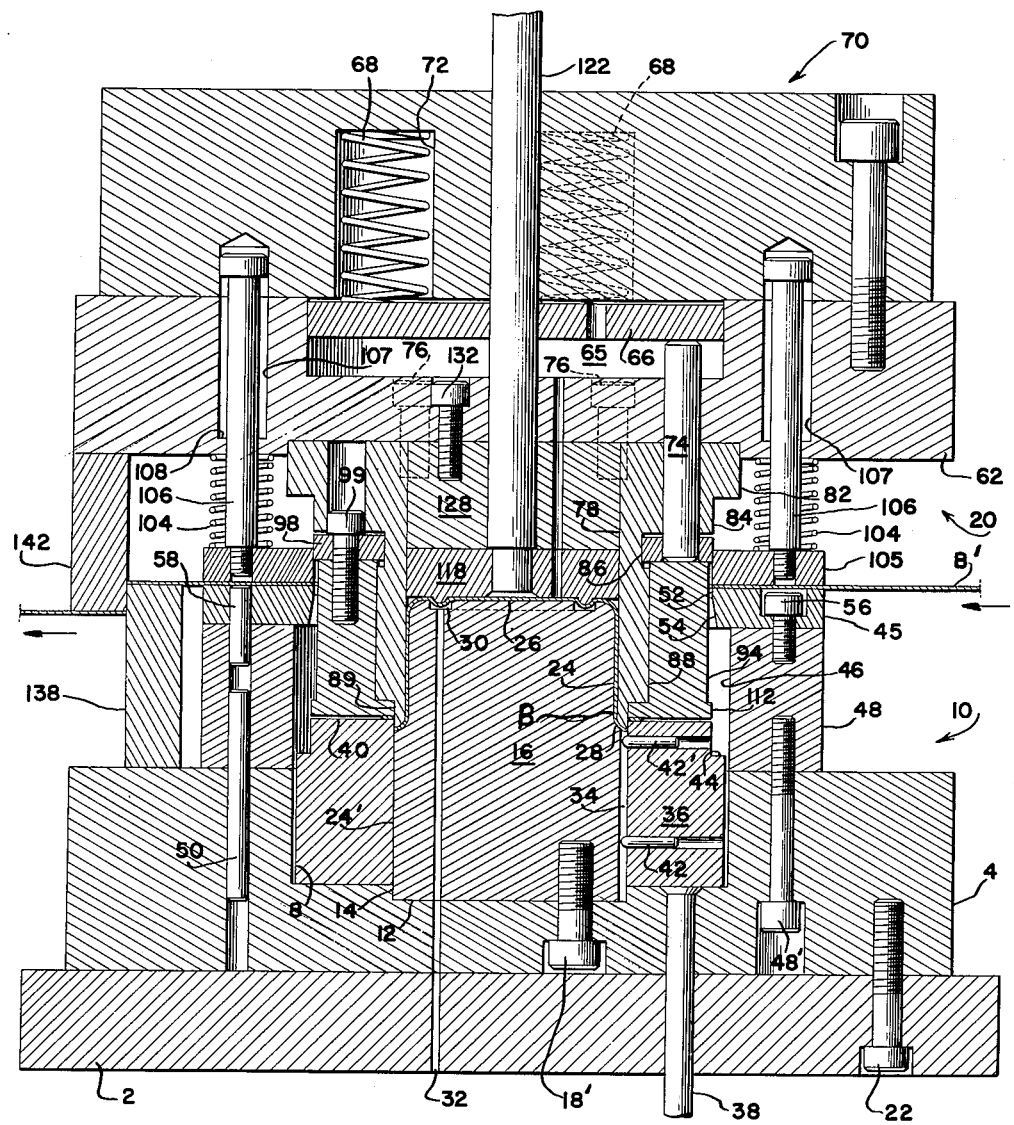
Fig. 3 is a sectional view similar to Fig. 1 and shows the position of the various components of the apparatus as they would appear at the end of the operating stroke of the die apparatus.
Figure 4:
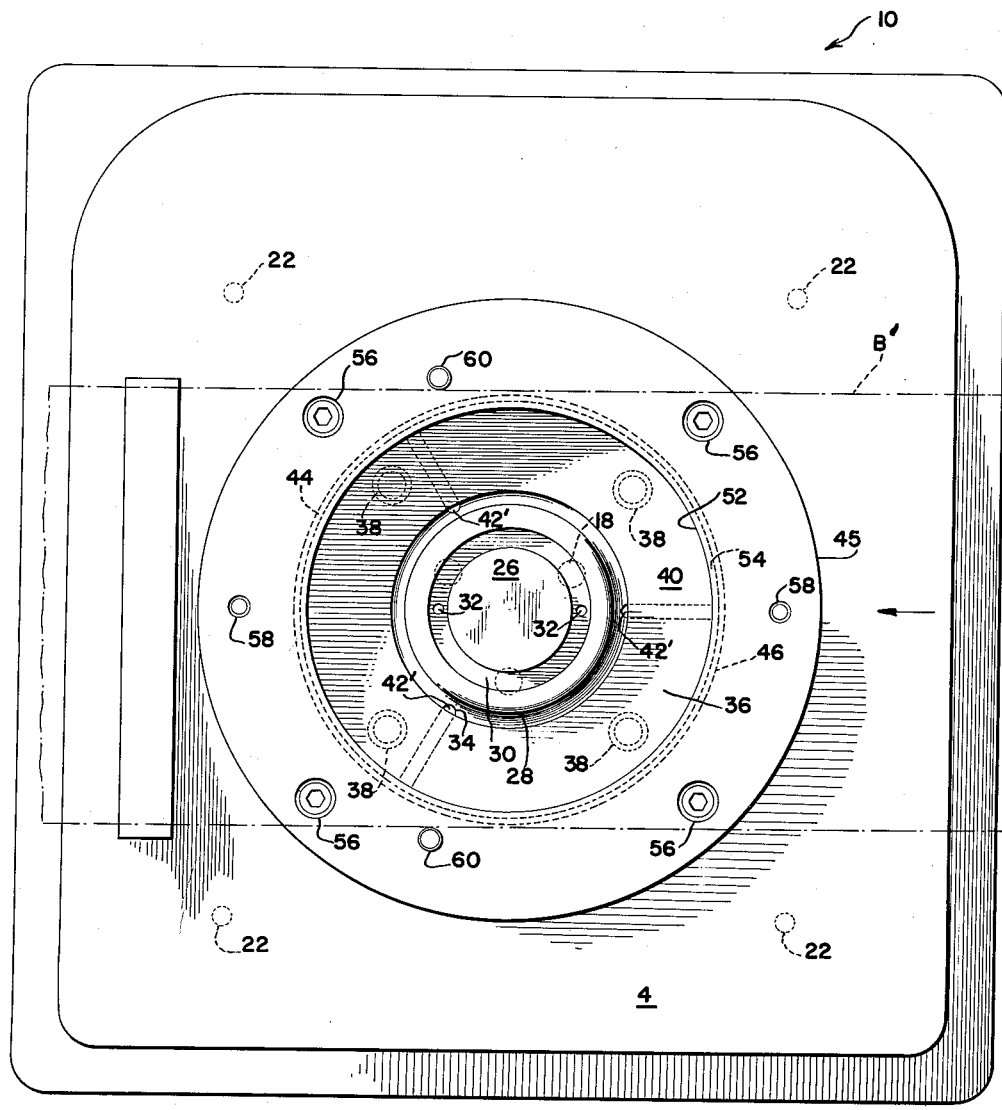
Fig. 4 is a top plan view of the lower and stationary part of the die apparatus shown in Figs. 1-3.

Located in circumscribing relation to the mandrel 16 is a vertically movable draw ring 36. This draw ring 36, as seen in Fig. 1, may move freely into and out of the recess defined by the wall 8 and the walls 24 and 24' of the mandrel 16 and moves from its rest position as shown in Fig. 1 to a bottomed position as shown in Fig. 3. The draw ring 36 is advantageously biased upwardly by means of a plurality of rods 38 which pass through both base 2 and die block 4 and have their lower ends (not shown) suitably connected to a suitable preloaded spring mechanism for exerting a constant predetermined upward pressure thereon, which in turn is transmitted to draw ring 36. Thus, as shown in Fig. 1, the draw ring 36 remains in its uppermost or at rest position until such time as the downward vertical pressure against its upper surface 40 is sufficient to overcome the constant pressure exerted thereon by the rods 38, at which time the draw ring 36 will be forced downwardly as shown in Fig. 3. Draw ring 36 is also provided with a plurality of inwardly projecting radially and horizontally disposed pins 42 and 42'. These pins are press fitted into immobile position in a series of radial bores provided in draw ring 36 and as may be seen in Figs. 1 and 3, project inwardly and are generally slidable in the vertical slots or grooves 34 provided in the mandrel 16. The number of pins 42, 42', which are provided is equal to the number of slots 34 provided in the mandrel 16. The function of the pins 42, 42' is two fold. First, they prevent any undesirable angular movement of draw ring 36 around mandrel 16, and secondly, the pins 42' act as a blank stripper mechanism in a manner to be presently described.

In order to limit the degree of upward travel of the draw ring 36, its outer peripheral surface is stepped to define an annular land 44. This land 44 engages the under surface of an annular blank cutter 45. This cutter 45 rests in turn on a hollow cylindrical spacer member 48 which is positioned on die block 4 so as to be concentric with respect to the annular recess therein and also such that its inner cylindrical wall 46 is concentric with and forms a continuation of the cylindrical wall 8. The spacer member 48 is fixed to die block 4 by means of machine screws 48', as shown in Figs. 1–3, and gauge pins 50 inserted in suitable aligned apertures in both elements.

It will also be observed that blank cutter member 45 is provided with an inner cylindrical wall 52 defining an annular or circular shearing edge and a conical portion 54 such that the inner diameter of the cutter 45 is larger at the bottom than at the top thereof. It will be noted that when at rest, the top surface of the draw ring 36 is in a common horizontal plane with the topmost edge of wall portion 52. It is also spaced slightly above the top surface of the mandrel 16.

The blank cutter 45 is held in fixed relation on the annular spacer 48 by machine screws 56. In order to provide a flat surface upon which the blank B may rest, the heads of the screws 56 are also countersunk. The blank cutter 45 is also provided with suitable apertures through which gauge pins 58 pass, these pins 58 being received in suitable apertures provided in annular spacer 48. In fact, as seen in both Figs. 1 and 2, the gauge pins 50 and 58 are coaxial and share common apertures in spacer member 48.

Provided on the upper annular surface of the blank cutter 45 is a pair of spaced guide pins 60 which are press fitted into a suitable aperture therein. The purpose of these projecting pins 60 will be subsequently apparent.

The lower assembly 10 thus described may be seen to comprise the male die assembly including the mandrel 16, the various elements of which except for draw ring 36, are stationary.

Referring again to Fig. 1, the upper and movable assembly 20 will now be described in detail. The upper die assembly 20 is carried upon a vertically movable punch plate 70 of a suitably operated drawing apparatus which is not shown in detail since it does not form any essential part of the instant invention.

The punch plate 70 receives upon its lower face a base member or plate 62 provided with a central cylindrical chamber 65 which opens upwardly toward the punch plate 70. Within this chamber 65 is located a disc-like piston 66. This piston 66 in its "at rest" position, is normally biased downwardly toward the bottom of cylindrical recess 65 by means of a plurality of coil springs 68 or the like disposed within suitable recesses 72 in plate 70 and within which they may be compressed as shown in Fig. 3. The piston 66 in turn engages a plurality of suitably arranged push pins 74 (only one of which is shown) which pass through the bottom of the cylindrical chamber 65 and through suitable apertures in base member 62 until they project a substantial distance beyond and below the lower surface of base member 62.

Fixed to the base member 62 by suitable machine bolts 76 countersunk below the bottom of cylindrical chamber 65 is a barrel-like straight walled female die member 80. This die member 80 has an inner cylindrical wall 78 and a stepped outer peripheral wall comprised of a series of concentric cylindrical portions 82, 84, 86, 88 and 89. The portion embraced by outer peripheral wall 82 comprises a base which fits within a suitable shallow annular recess 92 in the bottom surface of the base member 62 to maintain the barrel-like female die member 80 in proper coaxial relation with respect to the previously described cylindrical chamber 65.

Located exteriorly of and in circumscribing relation to the barrel-like female die member 80 is a sleeve-like member 94. Member 94 is disposed in opposed and aligned relationship with respect to draw ring 36. This sleeve-like member 94 advantageously snugly surrounds and engages the outer wall portion 88 of the female die member 80 and is slidable axially with respect thereto. In order to limit the amount of axial movement of this sleeve member 94, the lowermost portion of the inner surface thereof is provided with a reduced portion defining a peripheral lip 96 which may engage outer wall portion or land 89' of the female die member 80. Normally, however, the pressure of springs 68 upon piston 66 and in turn on the pins 74 and sleeve 94 will keep lip 96 spaced from land 89' until the female die bottoms for a purpose to be hereinafter described. The top of the sleeve 94 is also provided with a stop ring 98 fixed in coaxial relation thereon by bolts 99. This stop ring 98 is slidably engageable with the reduced portion 86 of the outer circumferential surface of the die member 80 and is provided with an internal peripheral portion 101 which abuts the annular land between stepped surfaces 86 and 88. In Figs. 1 and 2 there is shown a space between the internal peripheral lip 96 on sleeve member 94 and the annular land 89' between stepped portions 88 and 89 on the female die member 80. A similar clearance is provided between the stop ring 98 and the land defined between stepped portions 84 and 86 of the outer circumference of female die member 80. Thus, within the limits defined by the stop ring 98 and the annular lip 96, the sleeve-like member 94 may move axially relative to female die member 80.

The sleeve-like member 94 is biased in its lowermost position, as shown in Fig. 1, by pins 74 which are vertically slidable in suitable apertures in both die block 62 and female die member 80. These pins 74 have their lower end resting against the top of the axially slidable sleeve-like member 94, while their top ends rest against the disc piston 66. Because they are in engagement with the piston-like member 66 they are thus normally biased downwardly by the action of springs 68 as shown in Figs. 1–3. Thus, the sleeve-like member 94 along with lip 96 thereof is also biased downwardly in its "at rest" position.

Surrounding the axially movable sleeve 94 and biased downwardly by suitable compression springs 104 is a clamping ring 105. This ring is axially movable with respect to the sleeve 94 and is normally held against extreme over extension with respect thereto and against the lower edge thereof by a plurality of machine bolts 106 with the springs 104 surrounding bolts 106. The bolts 106 are in turn carried in recesses 107 provided in base plate 62. As shown in Fig. 1, the heads of these bolts 106 abut against suitable lands 108. Thus, their downward movement as well as that of the clamping ring 105 to which they are connected is limited.

It may be seen that the clamping ring 105 has its internal surface in engagement with a small peripheral lip 112 provided on the outer surface of the sleeve-like member 94 in its normal "at rest" position. It is also provided with apertures 114 which are adapted to register with pins 60 on lower assembly 10 as and for the purpose to be hereinafter described.

Referring now to the interior of the female die member 80, it may be seen that the lower interiorly disposed peripheral edge or outwardly flaring lip portion 116 is preferably rounded. The radius of this rounded edge 116 is the same as that utilized in forming the arcuate, annular land 28 provided on the mandrel member 16 so that there may be a mating therebetween.

Also disposed interiorly of the barrel-like female die member 80 is a suitable ejector mechanism including a disc-like ejection piston 118 connected to a rod 122 which is normally urged in an upward direction by spring means (not shown) until it reaches a predetermined fixed position of rest as shown in Fig. 1. Rod 122 extends upwardly through suitable vertically aligned apertures in spacer member 128, base plate 62, disc piston 66 and the punch plate 70. Rod 122 and piston 118 are movable in conjunction with the punch plate 70 once the force of the spring means (not shown) acting on the rod 122 is overcome. The normal "at rest" position of the disc-like piston 118 is shown in Fig. 1.

In order to limit the upward travel of the rod 122 and the disc-like ejector piston 118 during bottoming of the female die, a suitable spacer member 128 is disposed interiorly of the female die member 80 and abuts against the lower face of the base member 62 where it is fixed by a plurality of machine bolts 132 (only one of which is shown). Since the ejector piston 118 also helps to form the blank in a manner to be more fully described, it is essential that its retracted disposition within the interior of the barrel-like female die 80 be controlled during movement of punch plate 70 downward. This is done by the use of the spacer member 128.

The spacer 128, as well as the base member 62 and the ejector piston 118, are provided with aligned ports defining a venting line 134 as indicated in Fig. 2. Further, the lower face of the ejector disc 118 is provided with a raised bead 136 which is aligned with and of substantially the same diameter as the recess 30 provided in the top surface 26 of the mandrel 16 so as to mate therewith.

Referring in particular to Fig. 2, it may also be seen that the lower die block 4 and upper base member 62 are provided with cutter bars 138 and 142, respectively. The cutter bar 138 is, of course, stationary while cutter bar 142 reciprocates toward and away therefrom. These bars are disposed on the web exit side of the forming apparatus and cooperate when the punch assembly 70 moves downwardly to shear the web B' from which the blanks B are taken.

Having described in detail the components making up the apparatus of the instant invention, the operation thereof will now be described. By comparing Figs. 1, 2 and 3, it is believed that the various positions assumed by the several components of the apparatus will become clear as the description proceeds.

As has been indicated, Fig. 1 shows the various components making up the instant invention in their normal "at rest" position. When the apparatus is started the web B' is urged by a suitable intermittent feed mechanism in a direction as indicated by the arrows in the several figures. As soon as motion of the web B' has ceased, the punch plate member 70 begins its descent, picking up ejector piston 118 which becomes retracted into the female die 80 and thus becomes the top part thereof. Downward descent of the punch member 70 forces the clamping ring 105 into engagement with the web B' and also causes apertures 114 thereon to slide over the projecting pins 60 provided on the lower or male die assembly. These pins 60 serve both as a web guide and in addition project into the apertures 114 provided in the clamping ring 105 whereby the clamping ring will be simultaneously guided and stabilized with respect to the two die components 10 and 20.

As downward movement of the punch plate 70 continues the clamping ring 105 will clamp the web B' between itself and the top of the lower cutter member 45 due to the action of springs 104. Because of the fact that the clamping ring bolts 106 move interiorly of the recesses 107 provided in base plate 62, the clamping action of ring 105 against the top surface of the web B' will be undisturbed despite the continued downward movement of the punch assembly. Further movement of punch plate 70 downwardly also will draw female die member 80 as well as the surrounding sleeve member 94 downwardly. As the projecting lip 112 of sleeve member 94 emerges below the bottom of the clamping ring 105 it will engage the web B' and a formation of a suitable blank B effected by the coaction of this lip 112 and the inner peripheral edge 52 provided in the cutter 46. Thus, a disc-like workpiece B is cut out of the web B' and this workpiece is forced downwardly through the cutter ring 45 of lower die assembly 20 under the pressing action of punch plate 70. As the disc-like workpiece B is punched out of the web B' the workpiece will be forced into engagement with the upper surface of the draw ring 36 where it becomes clamped between draw ring 36 and the annular sleeve member 94. As the movement of the punch plate 70 continues, it is apparent that the disc-like workpiece will be drawn over the forming portions 24 and 26 of the mandrel 16. In addition, draw ring 36 will be forced downwardly into the recess defined by the cylindrical wall 8 and the outer peripheral walls of the mandrel 16. As indicated in Fig. 3, downward movement of punch plate assembly 70 and draw ring 36 will be undisturbed until such time as the draw ring 36 bottoms on or contacts the stepped bottom 12 provided in the lower base member 4, said stepped bottom 12 acting as a stop means for draw ring 36.

In addition, because of the clearance provided between the peripheral lip 96 of the sleeve member 94 and the previously described land 89' on the female die member 80, and the clearance between the other land on die 80 and lip 101 of ring 98, the rounded edge 116 of the female die member 80 will continue to slide down and ultimately emerge below the lip 96 of sleeve-like member 94 due to the downward thrust of punch plate assembly 70 which, at this time, overcomes the normal upward thrust of springs 68. This rounded edge 116 of the female die member 80 will then mate with the arcuate land 28 provided on mandrel member 16. Edge 116 will also be caused to project slightly below the top surface of the draw ring 36 as is clearly shown in Fig. 3. Thus it will be appreciated that, as the peripheral lip 116 of the female die member 80 becomes seated against the article which in turn is locked against the arcuate land 28, curling of the free edge of the cup-shaped article will be completed. This curling or flaring is, of course, initiated during the formation of the main body portion of the cup-shaped article because of the configuration of the female die element 80 and mandrel 16. Immediately prior to completing the curling action a shearing and trimming action will take place as the rounded edge 116 of female die 80 passes the cooperating edges of draw ring 36 and the sleeve 94 between which the blank edges are held. The necessary slight movement of the female die member 80 to accomplish all this is obtained because as the female die member 80 bottoms, the push pins 74 are caused to retract into opening 65, thus biasing the disc-like piston 66 against the springs 68, which springs compress into the apertures 72. The combined strength of springs 68 are not sufficient to overcome the force exerted by the punch plate assembly 70. At the same time the annular rib 136 on the bottom of the ejector member 118 will, in cooperation with the annular recess 30 provided in the top surface 26 of the mandrel, cause an annular reinforcing rib to be formed on the article being drawn as seen in Fig. 3.

The instant device can also be readily used in making a drawn cup that does not have a peripheral flare or flange. This can be done in one way for example by simply increasing the depth or length of wall portion 24 of mandrel 16 and decreasing the cross sectional thickness of the lip portion 96 on sleeve member 94 the necessary amount. When this is done the female die element 80 will act to draw the cup and trim the edge thereof at a given point. Then during the final portion of its downward movement, instead of completing the forming of a peripheral lip, the female die element 80 will merely force the material adjacent the inside radial edge of the female die element into a straight wall. It is to be understood, of course, that when the instant device is used in this fashion the size of the pins 42' as well as the size of the slots 34 in the mandrel 16 will be adjusted such that the pins 42' will be able to engage the edge of the drawn cup and raise it upwardly after fabrication of the cup in a manner to be described more fully hereinafter.

The entire article having been completed, the retraction of the upper punch plate member 70 results in a restoration of the various components to the position of rest as shown in Fig. 1 as will now be described.

At this point in the cycle of operation of the apparatus the vacuum vent 32, annular recess 30, ejector member 118 and line 134 are used to advantage.

As has been stated the ejector assembly including the ejector piston 118 and rod 122 are operable independently of as well as in conjunction with the punch plate assembly 70. Thus, as the punch plate assembly 70 and the associated forming and clamping elements begin to return to their "at rest" condition the ejector 118 will be held against the formed article due to the pressing action of the ejector pins 42' of draw ring 36 against the formed lip or edge of the drawn cup, it being remembered of course that ring 36 and pins 42' are constantly being urged upwardly by the spring biased rods 38 while ejector piston 118 is being urged upwardly by spring means (not shown).

As the ejector piston 118 and draw ring 36 move upwardly with the finished cup gripped therebetween, the pins 42' on the draw ring by engaging the curled edge of the finished article will cause the finished article to follow the ejector disc 118 until it clears the mandrel 16 and rests only on the pins 42'. At the same time that the finished blank will rest only on the pins 42' the ejector member 118 will have reached its position of rest as shown in Fig. 1 and air forced upwardly through vent elements 134 during downward movement of the die assembly will now have been reversed and be forced downwardly during upward movement of the die so as to cause the blank to be unfrozen from the disc 118. Since suitable stop means (not shown) are used to control the upward movement of rod 122 and ejector piston 118, the ejector piston will be moved upward to its normal position of rest as shown in Fig. 1. In this position it will be sufficiently spaced from the lower die assembly 10 whereby it will clear the finished article during removal of the same from the die. A suitable blower (not shown) then blows the finished article from between the die assemblies 10 and 20. Other blower means (not shown) may also be used for removing any scrap resulting from the drawing operation from the die.

Thus, it may be seen there has been shown and described a unique continuously operating die apparatus for forming cup-shaped articles from a continuous web in a single operating cycle of the apparatus. It is also obvious that various changes may be made in the invention thus described without departing from the spirit and scope thereof as defined by the following claims, wherein what is claimed is:

1. A die apparatus for forming cup-shaped articles comprising a stationary die assembly and a movable die assembly reciprocable toward and away from said stationary die assembly, said stationary die assembly including a mandrel and said movable die assembly including a female die member, stationary lip forming and flanging means on said mandrel and cooperating lip forming and flanging means on said female die member, a draw ring surrounding said mandrel and a sleeve-like member surrounding said female die member, the opposing edges of said draw ring and sleeve-like member cooperating to hold a blank therebetween, biasing means for maintaining the opposed edges of the draw ring and sleeve-like member in the same plane as the lip forming and flanging means on the female die member during the major part of the cup forming operation and encirclement of the mandrel by the female die member, means for moving the female die member toward the stationary die assembly said last-mentioned means being operative during the bottoming of the female die member for deactivating the said biasing means whereby said lip forming and flanging means on the female die member can freely slide past the said opposed edges of the draw ring and sleeve-like member and into engagement with the lip forming and flanging means on the mandrel to effect a trimming and flanging of the free end of the cup-shaped article, and stop means on said stationary die assembly for maintaining the said opposed edges of the draw ring and sleeve-like member above the lip forming and flanging means on the mandrel during the time the lip forming and flanging means on the female die member slides past the said opposed edges of the draw ring and sleeve-like member.

2. The combination as set forth in claim 1, including ejector piston means on the movable die assembly, said ejector piston means forming a closed end for said female die member and operable upon removal of the female die member from said mandrel to assist in removing a drawn cup-shaped article from between said die assemblies.

3. A die apparatus for forming cup-shaped articles from a flat blank in a single operating cycle comprising upper and lower die assemblies, one of which is movable toward and away from the other, one of said assemblies including a mandrel, an arcuate annular land on said mandrel, a draw ring surrounding said mandrel and movable relative thereto, the other of said assemblies including a female die member, a sleeve-like member disposed in aligned opposed relationship to said draw ring, said sleeve-like member also slidably surrounding said female die member and said sleeve-like member and draw ring having opposed blank engaging surfaces, said draw ring and said sleeve-like member acting in conjunction with said female die member for engaging and drawing the blank over the said mandrel and for forming a cup-shaped article on the mandrel, said female die member including an inner arcuate peripheral edge which is adapted to mate with the said arcuate annular land on said mandrel during the bottoming of the female die member and to effect a final flaring of the peripheral lip of the drawn article, means for moving the peripheral edge of the female die member relative to the opposed blank-engaging surfaces of said sleeve-like member and the draw ring so as to produce a trimming of the peripheral lip of the drawn article prior to the final flaring thereof and to completely bottom the peripheral edge of the female die member on said land, and means for maintaining the blank-engaging surfaces of said draw ring and sleeve-like member above the land on the mandrel when the female die member is bottomed.

4. In a die apparatus for forming cup-shaped articles having a flared peripheral lip from a flat web, a lower die assembly and an upper die assembly, said first-mentioned assembly including a mandrel having a base portion and a reduced article forming portion, the two portions being interconnected by a land portion, a draw ring surrounding said mandrel and vertically slidable with respect thereto such that in its lowermost position the upper inner peripheral edge of said draw ring will be disposed slightly above the land portion of said mandrel, blank ejection means on said draw ring and means on said mandrel cooperating with said ejection means for receiving said ejection means when the draw ring is in its lowermost position, said second-mentioned assembly including a female die member movable into circumscribing relation with respect to said mandrel, said female die member including a peripheral edge movable into engagement with said land portion for flaring the lip of an article being formed, a sleeve-like member slidably surrounding the peripheral edge of said female die member and disposed in opposed aligned relationship with said draw ring, said sleeve-like member and said draw ring acting as a blank holder during the movement of said female die member into circumscribing relation with respect to said mandrel, and means for maintaining the upper inner peripheral edge of the draw ring along with said sleeve-like member above said land portion on the mandrel during the time the peripheral edge of the female die member is being brought into full engagement with said land portion whereby said female die member can trim and then completely flare the lip of the article being formed.

5. A die apparatus for forming cup-shaped articles having a flanged peripheral lip from a flat blank in a single operating cycle, comprising a lower stationary die assembly and an upper concentric, vertically reciprocable die assembly movable into and out of engagement with said stationary lower die assembly, said upper assembly comprising a female die member having a cylindrical inner wall terminating in an outwardly flaring lip portion, a sleeve member snugly surrounding the outer wall of said female die member and slidable with respect thereto, means for biasing said sleeve member with respect to said female die member such that the lower edge of said sleeve member is normally disposed along the same plane as the lip portion of said female die member, a clamping ring surrounding said sleeve member, said lower assembly including a fixed forming mandrel having a reduced portion and a base portion interconnected by a land portion, a draw ring surrounding and slidable with respect to said mandrel, said draw ring also being disposed in aligned opposed relationship to said sleeve member, a blank cutter member surrounding said draw ring, said sleeve member, said female die member and said draw ring all cooperating upon movement of said upper assembly toward said lower assembly to cut a flat blank from an intermittently moving strip and then clamp and draw the flat blank over said mandrel and means for causing downward movement of the female die member until the lip portion thereof passes the lower edge of said sleeve member and the upper surface of the draw ring and thereafter mates with the land portion of the mandrel whereby the movement of the lip portion of said female die member past the lower edge of said sleeve member and the upper surface of the draw ring will effect a trimming of the lip on the blank while the mating of the lip portion of said female die member with said land portion will complete the flanging of the said lip of the blank.

6. In a die apparatus of the type described for drawing a cup-shaped article, the combination of a female die assembly and a male die assembly adapted to cooperate therewith, said male die assembly including draw ring means and stationary land means, said female die assembly being provided with common means for both drawing a cup-shaped blank and trimming the free edge of the completed blank, said common means on said female die assembly including a lip means, sleeve means slidably disposed with respect to said lip means, said sleeve means also being disposed in opposed aligned relationship to said draw ring means, said sleeve means and draw ring means also having opposed blank-engaging surfaces, means for effecting movement of said lip means past the blank-engaging surfaces of the sleeve and draw ring means and then into engagement with said stationary land means so as to effect a trimming and final formation of the free edge of the completed blank, and stop means for maintaining the blank-engaging surfaces of the sleeve and draw ring means above the stationary land means of the male die assembly during movement of the lip means of the female die assembly past the blank-engaging surfaces of the sleeve and draw ring means.

7. A die apparatus for forming cup-shaped articles comprising a stationary die assembly and a movable die assembly reciprocable toward and away from said stationary die assembly, said stationary die assembly comprising a mandrel and said movable die assembly including a female die member, stationary edge forming means on said mandrel and cooperating edge forming means on said female die member, a draw ring surrounding said mandrel and provided with a blank-engaging surface, and a sleeve-like member surrounding said female die member and provided with a blank-engaging surface, an ejector piston forming the closed end portion of said female die member, said draw ring and said sleeve-like member acting in conjunction with said female die member for drawing a flat blank over the said mandrel and for forming the body portion of a cup-shaped article from the flat blank, means for actuating said female die member and for bringing it into engagement with said mandrel, means for biasing said sleeve-like member with respect to the edge forming means on the female die member, means operable during the bottoming of the female die member for deactivating said biasing means and for allowing movement of said last-mentioned edge forming means with respect to the blank-engaging surfaces of the draw ring and sleeve-like member during the bottoming of the female die member and for bringing said last-mentioned edge forming means into engagement with the stationary edge forming means on the mandrel whereby a trimming and edge forming of the free extremity of the cup-shaped article will be accomplished, and stop means for maintaining the blank-engaging surfaces of the draw ring and sleeve-like member above the edge forming means on the mandrel when the female die member is bottomed.

8. A die apparatus for forming cup-shaped articles comprising a stationary die assembly and a movable die assembly reciprocable toward and away from said stationary die assembly, said stationary die assembly including a mandrel and said movable die assembly including a female die member, lip forming and flanging means on said mandrel and cooperating lip forming and flanging means on said female die member, a draw ring surrounding said mandrel and a sleeve-like member surrounding said female die member, the opposing edges of said draw ring and sleeve-like member cooperating to hold a blank therebetween, biasing means for maintaining the opposed edges of the draw ring and sleeve-like member in the same plane as the lip forming and flanging means on the female die member during the major part of the cup forming operation and encirclement of the mandrel by the female die member, means for moving the female die member toward the stationary die assembly, said last-mentioned means being operative during the bottoming of the female die member for deactivating the said biasing means whereby said lip forming and flanging means on the female die member can freely slide past the said opposed edges of the draw ring and sleeve-like member and into engagement with the lip forming and flanging means on the mandrel to effect a trimming and flanging of the free end of the cup-shaped article, and ejector means on said draw ring for engaging the flanged portion of a drawn and cup-shaped article and for stripping the cup-shaped article from the mandrel.

9. A die apparatus for forming cup-shaped articles comprising a stationary die assembly and a movable die assembly reciprocable toward and away from said stationary die assembly, said stationary die assembly including a mandrel and said movable die assembly including a female die member, lip forming and flanging means on said mandrel and cooperating lip forming and flanging means on said female die member, a draw ring surrounding said mandrel and a sleeve-like member surrounding said female die member, the opposing edges of said draw ring and sleeve-like member cooperating to hold a blank therebetween, biasing means for maintaining the opposed edges of the draw ring and sleeve-like member in the same plane as the lip forming and flanging means on the female die member during the major part of the cup forming operation and encirclement of the mandrel by the female die member, means for moving the female die member toward the stationary die assembly, said last-mentioned means being operative during the bottoming of the female die member for deactivating the said biasing means whereby said lip forming and flanging means on the female die member can freely slide past the said opposed edges of the draw ring and sleeve-like member and into engagement with the lip forming and flanging means on the mandrel to effect a trimming and flanging of the free end of the cup-shaped article, an ejector piston means on the movable die assembly, said ejector piston means forming a closed end for said female die member and operable upon removal of the female die member from the said mandrel to assist in removing a drawn cup-shaped article from between said die assemblies, and ejector means on said draw ring for engaging the flanged portion of the drawn cup-shaped article and for stripping the cup-shaped article from the mandrel.

References Cited in the file of this patent

UNITED STATES PATENTS

| | | |
|---|---|---|
| 913,841 | Opsal | Mar. 2, 1909 |
| 1,526,013 | Roseberry | Feb. 10, 1925 |
| 2,119,662 | Williams | June 7, 1938 |
| 2,177,027 | Plumb | Oct. 24, 1939 |
| 2,324,205 | Gladfelter | July 13, 1943 |
| 2,331,491 | Menkin | Oct. 12, 1943 |
| 2,475,830 | Fink | July 12, 1949 |
| 2,625,896 | Immenroth | Jan. 20, 1953 |
| 2,656,887 | Judd | Oct. 27, 1953 |
| 2,763,228 | Lawson | Sept. 18, 1956 |

FOREIGN PATENTS

| | | |
|---|---|---|
| 19,212 | Norway | Aug. 9, 1909 |